July 3, 1956 R. A. PETERSON Re. 24,175

TRACTOR WITH TWIN POWER PLANTS

Original Filed Jan. 18, 1951 8 Sheets-Sheet 1

INVENTOR.
ROBERT A. PETERSON
BY
A. Durham Ave
ATTORNEY

TRACTOR WITH TWIN POWER PLANTS

Original Filed Jan. 18, 1951 8 Sheets-Sheet 2

INVENTOR
ROBERT A. PETERSON
BY A. Drew Owen
ATTORNEY

TRACTOR WITH TWIN POWER PLANTS

Original Filed Jan. 18, 1951 8 Sheets-Sheet 3

INVENTOR.
ROBERT A. PETERSON
BY
A. Dunham Owen
ATTORNEY

TRACTOR WITH TWIN POWER PLANTS

Original Filed Jan. 18, 1951 8 Sheets-Sheet 4

INVENTOR.
ROBERT A. PETERSON
BY
ATTORNEY

INVENTOR.
ROBERT A. PETERSON
BY A. Durham Olver
ATTORNEY

TRACTOR WITH TWIN POWER PLANTS

Original Filed Jan. 18, 1951 3 Sheets-Sheet 6

INVENTOR
ROBERT A. PETERSON
BY
ATTORNEY

TRACTOR WITH TWIN POWER PLANTS

Original Filed Jan. 18, 1951 8 Sheets-Sheet 7

INVENTOR
ROBERT A. PETERSON
BY G. Durham Olver
ATTORNEY

TRACTOR WITH TWIN POWER PLANTS

Original Filed Jan. 18, 1951 3 Sheets-Sheet 3

INVENTOR
ROBERT A. PETERSON
BY
A. Donham Owen
ATTORNEY

United States Patent Office

Re. 24,175
Reissued July 3, 1956

24,175

TRACTOR WITH TWIN POWER PLANTS

Robert A. Peterson, San Leandro, Calif., assignor to Caterpillar Tractor Co., Peoria, Ill., a corporation of California Original No. 2,678,105, dated May 11, 1954, Serial No. 206,637, January 18, 1951. Application for reissue April 25, 1955, Serial No. 503,844

18 Claims. (Cl. 180—6.48)

Matter enclosed in heavy brackets [ ] appears in the original patent but forms no part of this reissue specification; matter printed in italics indicates the additions made by reissue.

This invention relates to a land vehicle.

In particular it relates to a vehicle of mammoth power and size [whish] *which* is easily [meneuverable] *maneuverable* and has special characteristics to facilitate its easy shipment in standard carriers.

One of the principal problems solved by this invention is the provision of a large land vehicle of great power and size yet with features of construction which enable it to be quickly divided in half with unskilled labor for movement on existing highway or rail transport carriers. [Also, so constructed] *The construction provided is such* that assembly at the work site can be accomplished by unskilled labor and in a very short time.

Solution of the foregoing problem as accomplished by this invention also has resulted in some unexpected and very meritorious results. For example, because the vehicle in its preferred form has two complete power plants each with its own drive and control, [and with] each power plant driving the traction element on its own side, tremendous gains are made in smooth maneuverability and the proper use of available horsepower.

Another advantage of the device of the present invention comes in its use when working under load. In vehicles heretofore which could only steer by slipping a clutch or applying a brake to one side there has resulted not only rough steering but also a waste of power. With the present device where there is a separate power plant driving each [side of the vehicle,] *traction element,* steering may be accomplished smoothly by varying the speed of either engine without diminishing the efficiency with which the power of each engine reaches [the drive wheel or track.] *each traction element.*

Another advantage of the separate drives to each [wheel or track] *traction element* is in the ability to apply undiminished power to both [tracks] *traction element* by the selection of lower or higher gears in opposite transmissions. For example, on a left turn the left transmission could be placed in low gear while the right transmission remained in second gear. This would produce a left turn with full power being delivered from both engines.

The ability of a tractor to produce pulling power is in direct proportion to its weight. In the earlier steering means effected by cutting off power [on]*to* one [side] *traction element* to steer, it is the same as rendering useless the weight applied to that side. This problem is solved by the present invention where in negotiating gradual turns under load power can continue to be applied to both [sides] *traction elements* without loss in efficiency or any wastage of power.

In solving the problem of size and transportability from factory to work site, or in the case of military vehicles from storage to point of use, the present invention has accomplished the result by providing a right hand and left hand [power unit,] *half of a tractor,* each complete in itself [and] with [their] *its* transmission case[s] and frame[s] constructed to fasten together [as units.] *thus providing a separate frame for each half of the tractor.* Each [unit] *half* is made in a size to come within the shipping limits of a railroad car or a transport plane and when it reaches the work site, it can be combined with the other parts in short order by unskilled workmen. The cases, control levers, strengthening frame members and the severable stiff beam all align and are attached with simple external bolt joints. There are no fluid connections for oil or fuel and no sealing gaskets to be connected when the vehicle is assembled or disassembled as the case may be.

The present invention provides a tractor of unusual width which offers another solution to the problem of having a firm foundation for a side boom without the necessity of having one track support a massive counterweight.

While the devices described to illustrate embodiments of the invention show a track layer type of vehicle, the invention is equally applicable to wheel type vehicles in which case wheels with road engaging surfaces are substituted for the drive [sprocket wheels] *sprockets* that [move] *engage* the tracks and for the idler wheels near the front end of the tracks.

One form which my invention may take is shown in the accompanying drawings in which—

Figure 1:
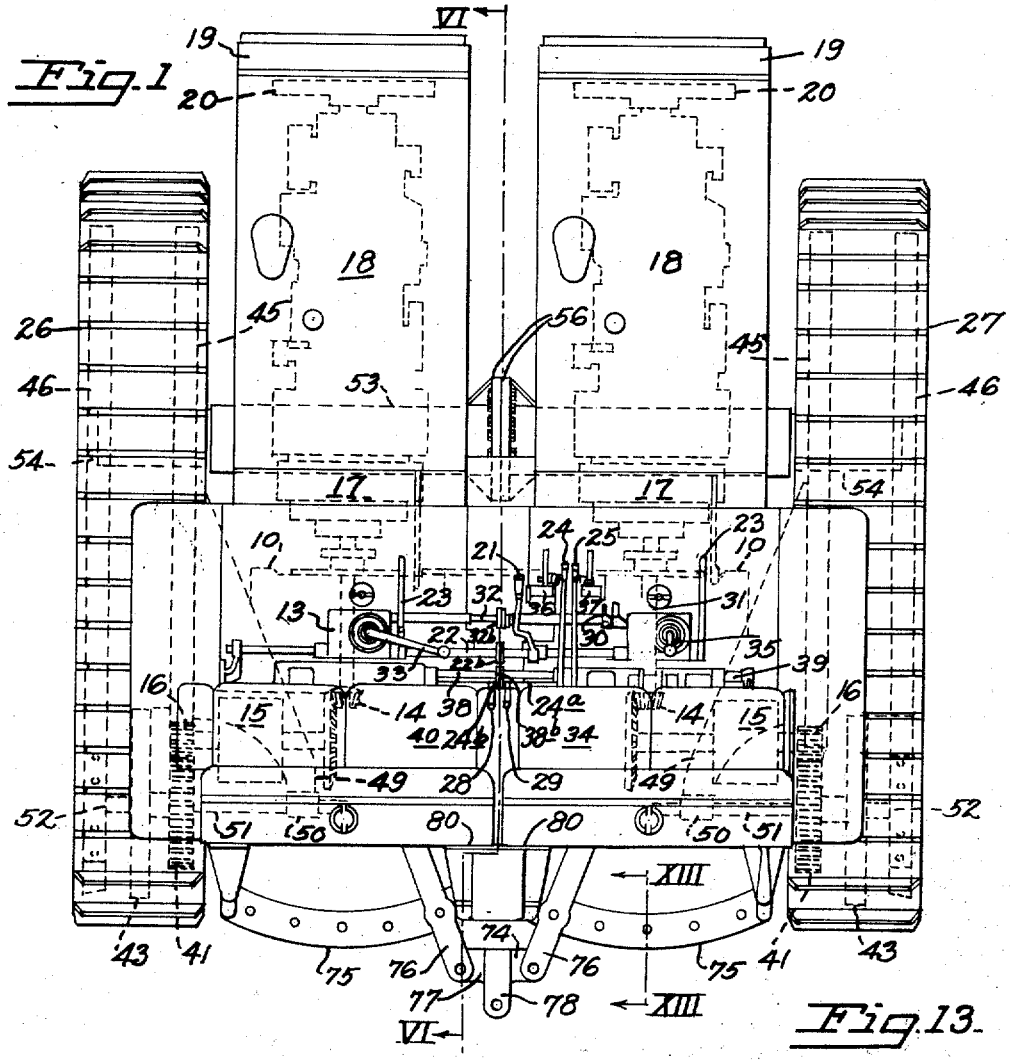
Fig. 1 is a plan view of the complete vehicle.
Figure 13:
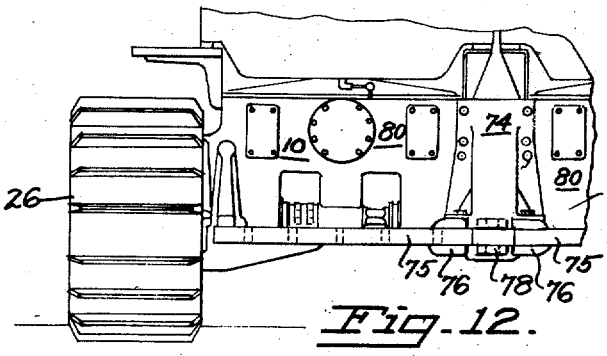
Fig. 13 is a view of the rear taken on the line XIII—XIII in Fig. 1.
Figure 12:
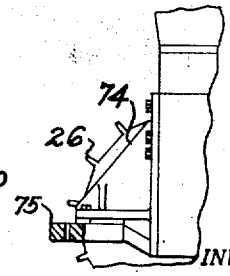
Fig. 12 is a fragmentary view in elevation of a portion of the rear of the vehicle to show how the drawbar crescents are supported.

It is to be understood that the form of the parts herewith shown and described is to be taken as a preferred example of the same, and that various changes in the shape, size and arrangement of parts may be resorted to without departing from the spirit of the invention or the scope of the appended claims.

In solving the problems which led to this invention provision is made for securing together two complete tractor chassis, each with its own power plant, transmission, [drive wheel,] *traction element,* fuel supply, and controls.

The right hand power unit is provided with a [track or wheel] *traction element* for supporting and moving the right side of the vehicle and the left hand power unit is provided with its [track or wheel] *traction element* for supporting and moving the left side of the vehicle. The right and left hand units are connected together at the forward ends by a severable stiff beam and at the rear end by a king bolt and by a connecting plate. The separate controls for the power units are preferably united by flanged couplings. These comprise the connections between the two units and make possible the advantages of easy assembly or disassembly, plus all the advantages of operation pointed out above.

The individual power units

Referring to the drawings, each unit has its own chassis *or frame* comprised of a main case 10 with forwardly projecting engine frame members 11 and 12. In the main case 10 is located the transmission 13, the bevel gear assembly 14, the steering clutch assembly 15, and the final drive gear reduction 16. Ahead of the main case lies the master clutch 17 and the engine 18 with its radiator 19 and fan 20. All of these parts are shown only diagrammatically and to indicate that in each unit is a completely independent power plant and drive, with controls which are preferably adapted to be brought to a common operating point.

The controls include a single master clutch lever 21 secured to cross shaft 22 with suitable linkage 23 to the master clutch throw out yoke (not shown).

The steering clutch levers 24, 25 carried on cross shafts 24a and 25a are positioned alongside each other. The lever 24 disengages the left track 26 and the lever 25 disengages the right track 27, by means of the steering clutches 15.

The throttle control levers 28 and 29 are arranged alongside each other and each is connected by suitable linkage to its own engine.

The forward and reverse transmission shifting levers 30 and 31 are arranged alongside each other. The lever 30 controls the transmission through the cross shaft 32 and the lever 31 is directly mounted on its transmission case.

The speed selecting lever 33 on the transmission for the left hand power plant is inclined toward the left side of the driver's seat 34 and the speed selecting lever 35 for the right hand power plant is on the right side of the driver's seat.

The two foot brake pedals 36 and 37 are in convenient reach of the driver's seat 34 and are connected by cross shafts 38 and 39 respectively to brake bands (not shown).

The controls are shown arranged for the driver to sit on seat 34 which is on the right hand unit, but they may be arranged for him to sit on seat 40 on the left hand unit.

Figure 2:
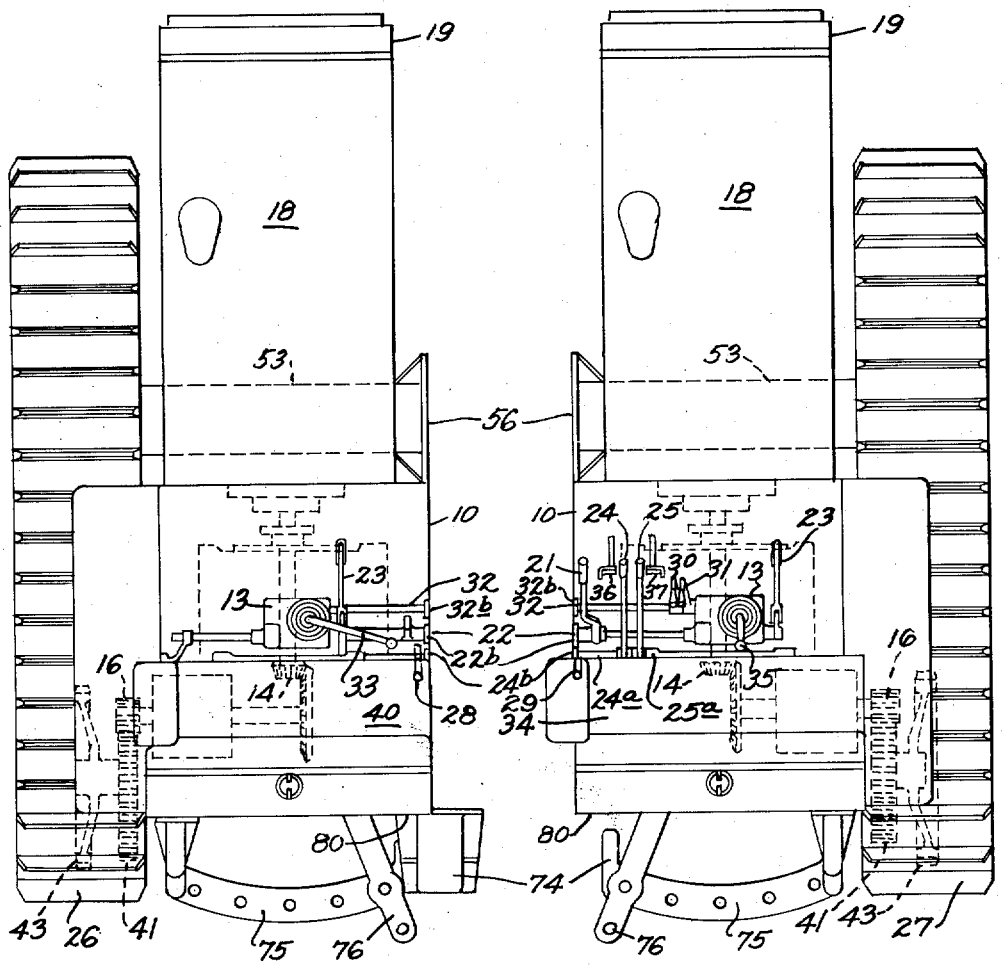
Fig. 2 is a plan view showing the units of the vehicle separated enough to illustrate the connecting parts.
Figure 6:
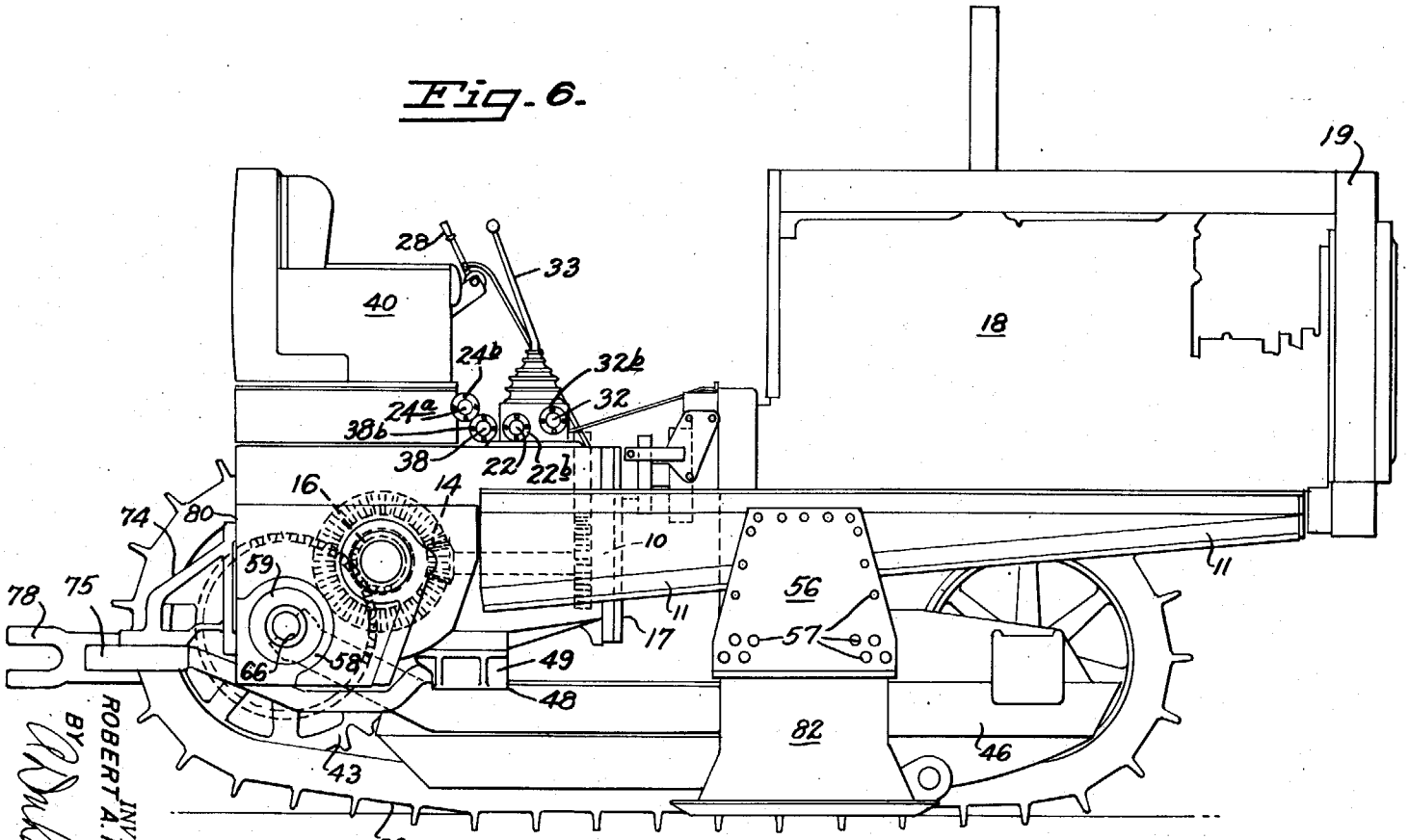
Fig. 6 is a view in side elevation of the left unit of Fig. 5, taken on the line VI—VI of Fig. 1, showing some of the connecting flanges.

When the units are split for shipment or repair the control cross shafts 22, 24a, 32 and 38 can be easily severed at the dividing line of the vehicle by means of a suitable flange or other form of coupling. These are shown in Figs. 1, 2, and 6 at 22b, 24b, 32b and 38b.

The final drive main gear 41 is mounted on the carrier hub 42 (see Fig. 3) to which is keyed the [track] *drive* sprocket 43 having teeth engaging the tracks 26 or 27.

The track 26 (left) and 27 (right) runs around the track roller frame 44 which has two box section longitudinal members 45 and 46 which extend substantially the full length of the frame. *An idler wheel is journaled on the front end of each track roller frame to support the front end of each track, the rear end of each track being supported by the drive sprockets 43 at the rear end of each track roller frame.* The inside member 45 terminates short of the final drive 16. The members are connected by the web 47 and at 48 the bracing bracket 49 is secured to the members. This bracket 49 constitutes one of the means by which the track roller frame is connected to the chassis at its rear end. This can be seen in dotted lines in Fig. 1 where the end 50 of the bracket engages the final drive dead axle or stub shaft 51. The axle or stub shaft 51 also engages a bracket (not shown) secured near the end of the member 46 at 52.

Figure 4:
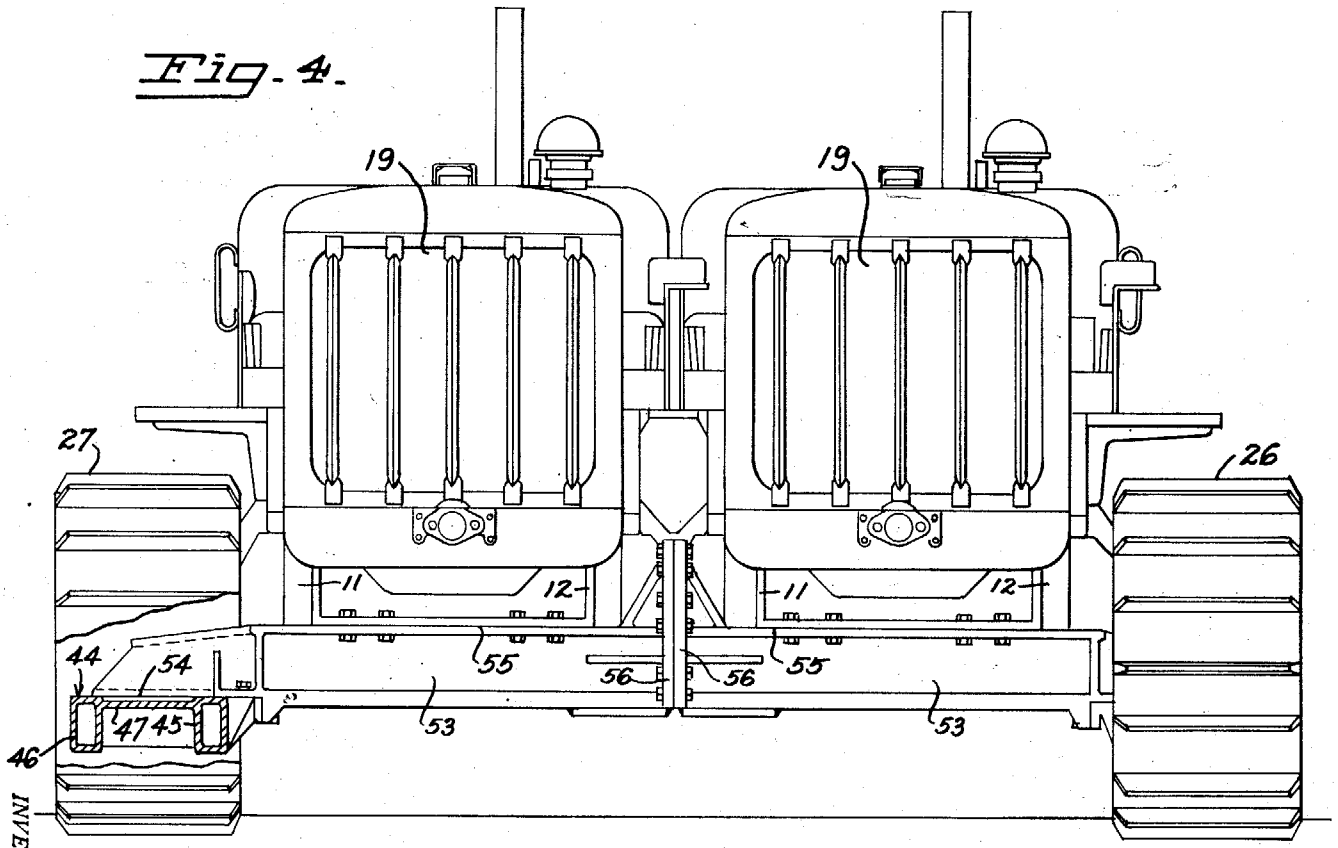
Fig. 4 is a like view looking at the front of the complete vehicle.
Figure 8:
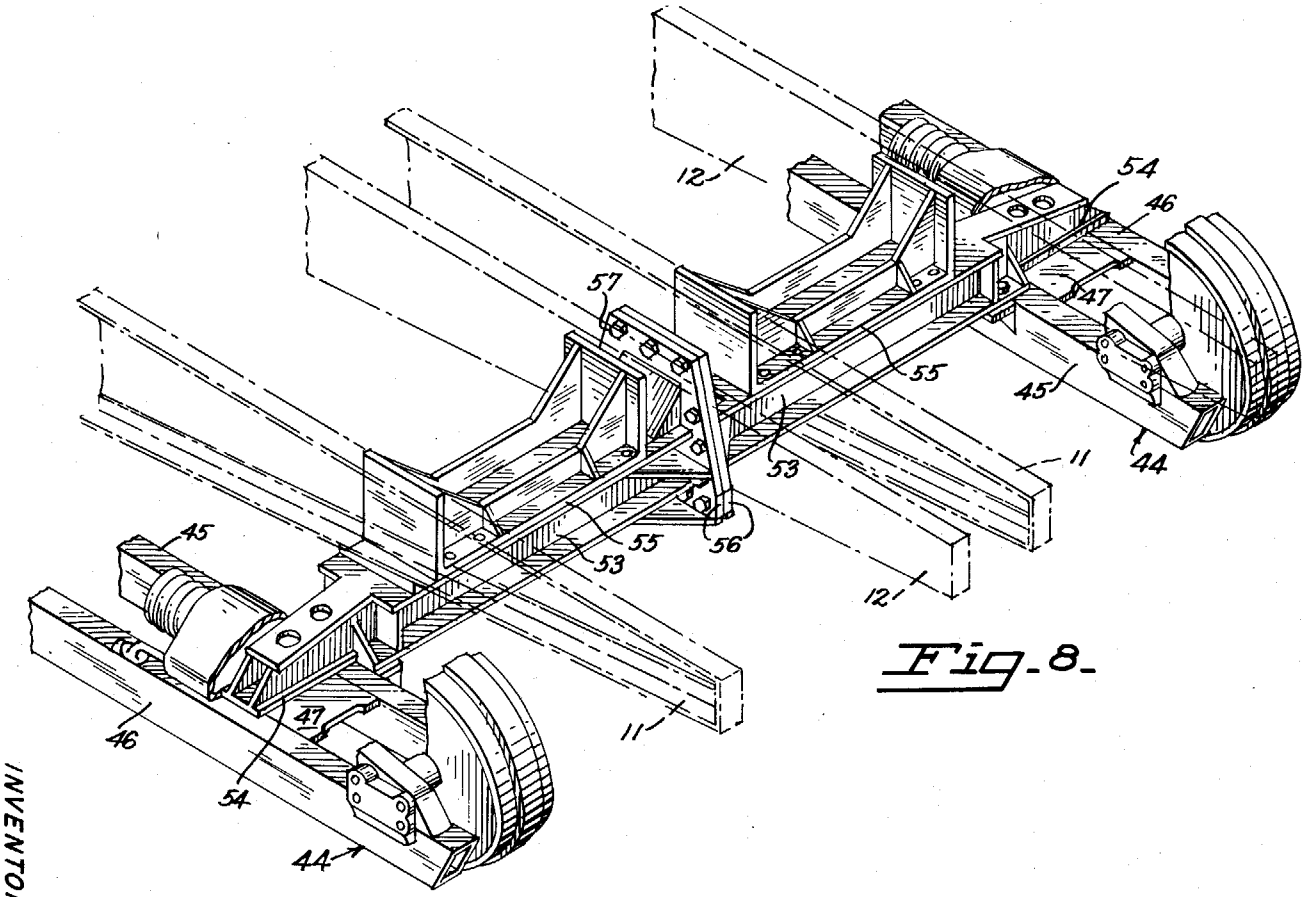
Fig. 8 is a similar view of the [serverable] *severable* stiff beam which secures together the two separable units at the front, with part of the frames and the idler rollers of the two units shown in place.

Forward connection (Figs. 4 and 8)

Figure 9:
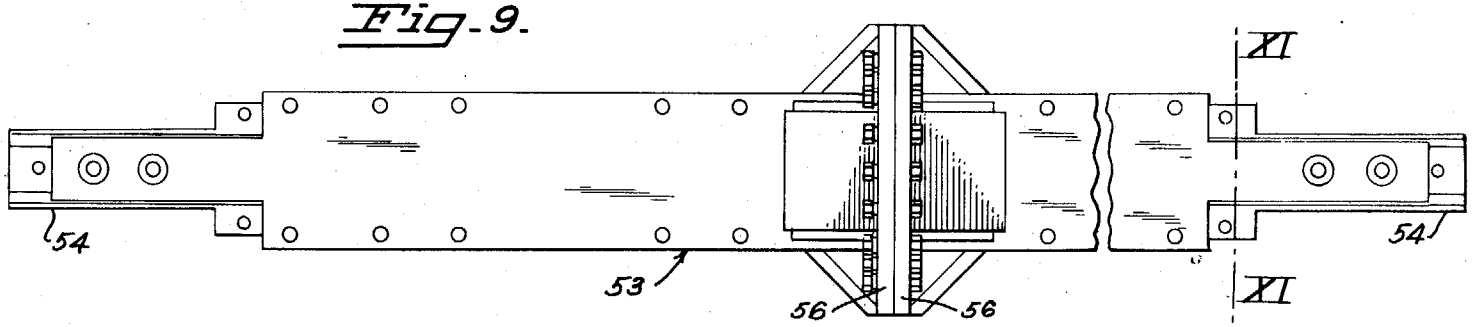
Fig. 9 is a plan view of the severable stiff beam.
Figure 10:
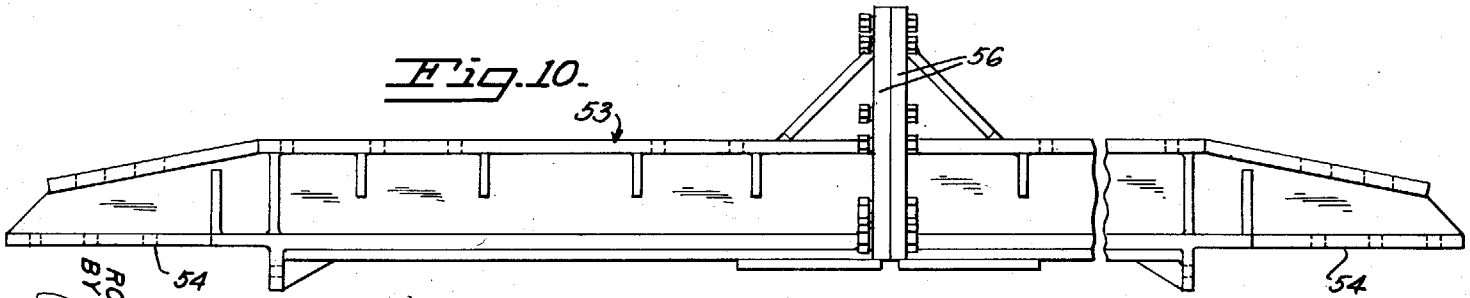
Fig. 10 is a view in elevation of the same part.
Figure 11:
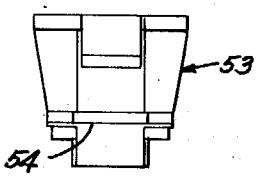
Fig. 11 is an end view of the stiff beam back to about the line XI—XI on Fig. 9.

The front end of the track *roller frame* on each unit is preferably secured to a portion 53 of a stiff beam which is in turn secured to the chassis. In Figs. 4 and 8 this is shown where the stiff beam is secured at 54 to the track *roller frame* and at 55 to the frame members 11 and 12. Each portion of the stiff beam 53 has a vertically positioned bolt flange member 56 with suitable [bolt receiving] holes *to receive bolts* 57 where the units join. The connection effected by these flange members 56 constitutes the only connection between the units at the forward end of the vehicle. Further details of the stiff beam are shown in Figs. 9, 10, and 11.

Figure 3:
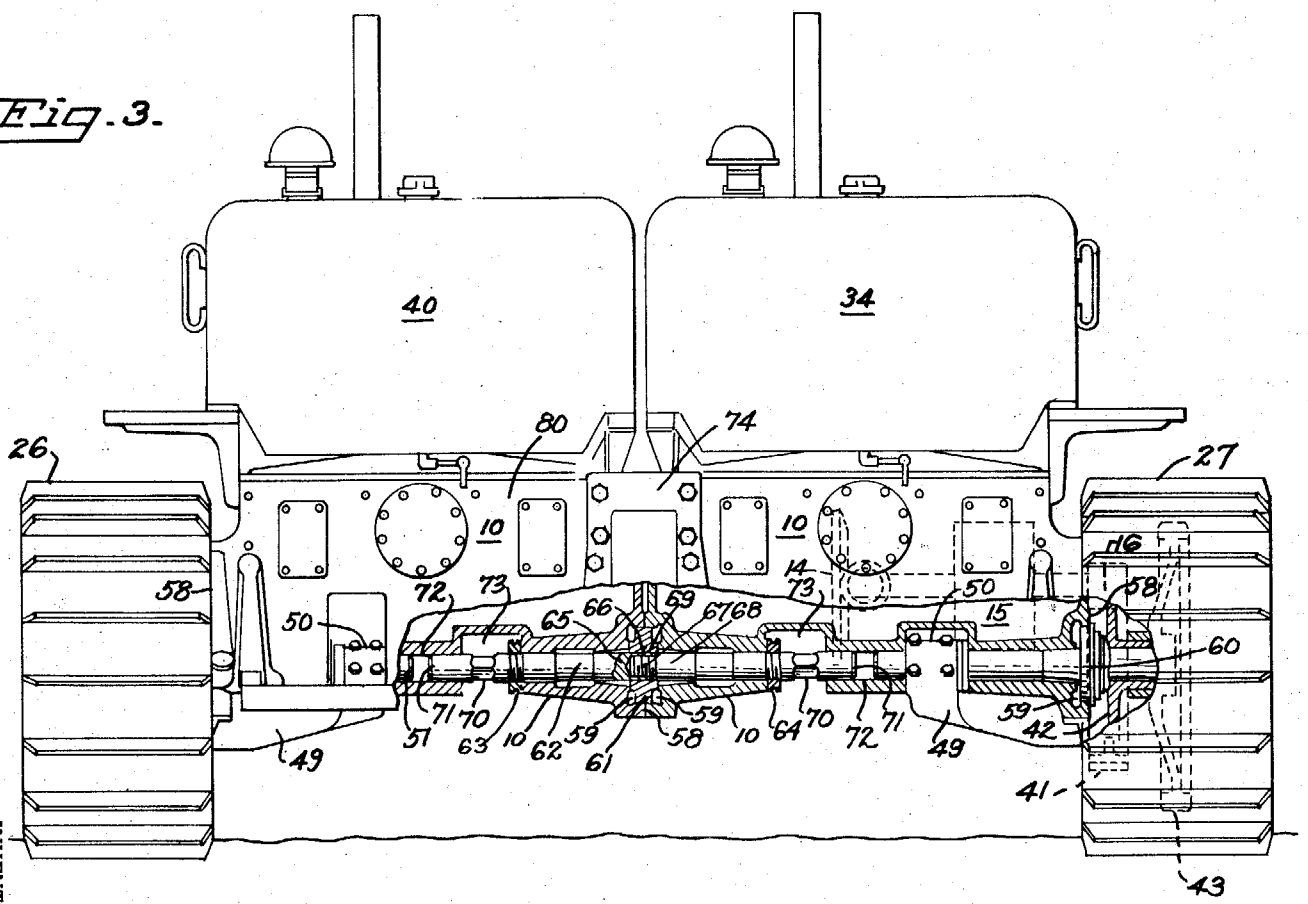
Fig. 3 is a view in elevation, partly in cross section, looking at the rear of the complete vehicle.
Figure 7:
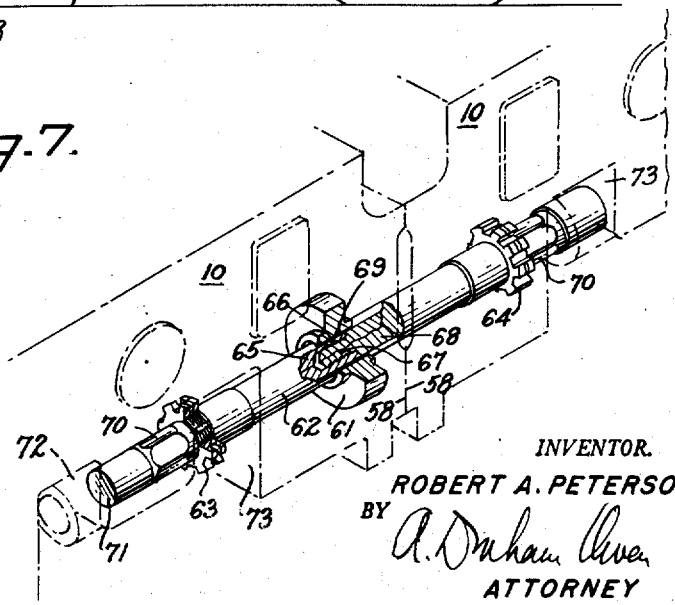
Fig. 7 is a view in perspective of the parts which secure together the two separable units at the rear.

Rear connection (Figs. 3 and 7)

One of the important features of the present invention, in making it practical for the units to be assembled speedily in the field by unskilled labor, is the form of the rear connection between the units. In one sense this connection is the key connection, as it assures alignment in all directions of the two units. Once the connection of the cases 10 has been made in the rear, the bolts 57 may be inserted and secured in the flanges 56 of the stiff beam and in the control couplings with complete assurance that the units are in perfect alignment.

The vehicle of this invention has a complete and independent right and left hand power [and track] unit *and traction element*. This means that the right hand unit will have a track 27 and track frame 45, 46 secured as above described to the right side of its chassis and the left hand unit will have a track 26 and track frame 45, 46 secured to the left side of its chassis. Each unit has its final drive 16 in a housing which is fitted against a flat, perfectly machined face 58 of the main case 10, and each has a recess 59 to receive a bearing 60 to support the inner end of the drive hub 42. By utilizing this machined face 58 and this bearing recess 59 the main case 10 of the right and left hand case units can be manufactured without regard to rights and lefts as the same machined faces 58 and the bearing recesses 59 will serve perfectly as the key in connecting the units together.

As shown in Figs. 3 and 7 the machined faces 58 of the two main cases 10 fit together in perfect alignment. The bearing recesses 59 receive an aligning plug 61. The main cases 10 are then secured or bolted together by means of a king bolt 62 with clamping nuts 63 and 64.

Preferably the king bolt 62 is made in two pieces the portion 65 having a female threaded end 66 to receive the male threaded end 67 of the portion 68. The construction is important for in assembling or disassembling the units, it means that they need only be pulled apart laterally by the distance necessary to clear the aligning plug.

The portion 65 fits through an opening 69 in the aligning plug 61. This need not be a snug fit as the outer periphery of the plug 61 is a close fit in the case recesses 59 and therefore does the aligning, while the king bolt 62 holds the cases together.

The portions 65 and 68 may be turned relative to each other to thread or unthread their mating parts 66 and 67, preferably after the mating faces 58 of the main cases have been brought together. A squared or hex area 70 is provided for rotating the portions. When the portions 65 and 68 comprising the king bolt 62 have been threaded together, the clamping nuts 63, 64 can be tightened and thereby secure together the aligned rear ends of the two vehicle units.

Figure 5:
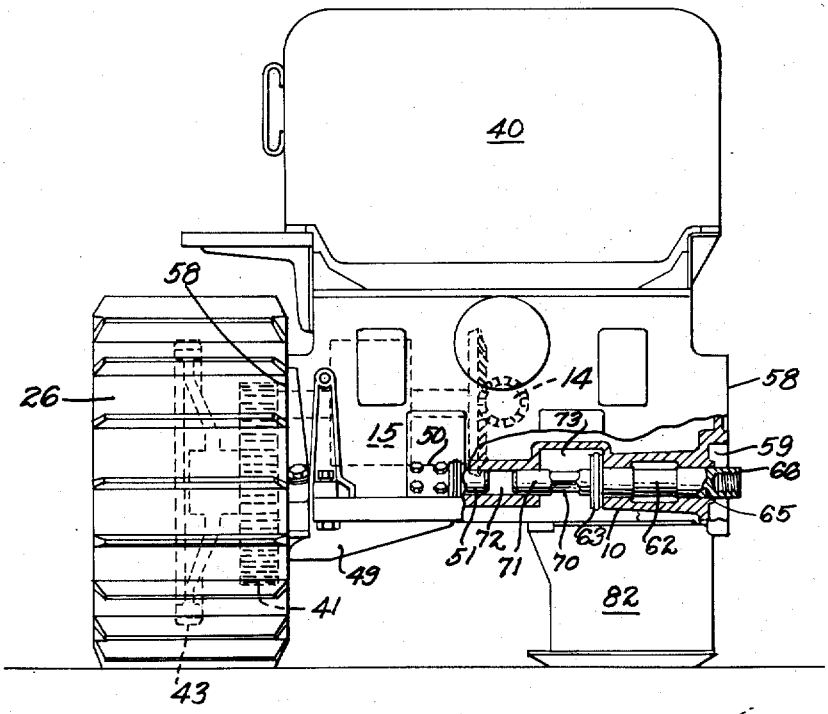
Fig. 5 is a like view looking at the rear of the left unit of the vehicle, as supported and separated for shipment.

The king bolt 62 is made about the same diameter as the dead axle 51 and fits into the corresponding bore 72 in the main case. The recesses 73 provided for the right or left brace 49 can be used to receive the clamping nut 63. The length of the king bolt parts 65 and 68 is such that when the male and female ends 66 and 67 are unthreaded the opposite ends 71 can be moved into the [space] *bore* 72 against the ends of the dead axles 51 and thus draw the threaded ends 66 and 67 into the bore 72, where they are protected while the vehicle units are apart. In Fig. 5 the end 66 is projecting beyond the case face 58 but as there is clearance at its end 71 it can be moved inwardly.

An additional rear connection 74 between the units is provided, primarily for its usefulness as a support for the draw bar crescent 75, on which the draw bars 76 slide. This connection 74 is bolted against the machined back faces 80 of the adjacent main cases 10 and provides an alignment member which prevents the right and left main cases 10 rotating relatively around the king bolt 62.

The drawbars 76 are brought together and are connected by a link 77 to provide a single draft connection 78.

Figs. 5 and 6 show the left unit of the vehicle with its track 26 supporting the left side of the unit and with a skid shoe 82 [secure] *secured* under the left part 53 of the stiff beam adjacent its flange 56. Preferably the skid shoe 82 is bolted to the stiff beam. There is also a skid shoe positioned under the right unit of the vehicle. The height of the skid shoes is such as to support the mating faces of the flanges 56 on the stiff beam and the mating faces 58 on the main cases 10 in parallel relation which will assure alignment of the units in position to be bolted together to make one vehicle.

As used herein "king bolt" is intended to include a fastening by means of which two adjacent main cases may be secured together as one.

Operation

For purposes of illustration, the operation in assembling and disassembling the vehicle of this invention will start with the factory upon completion of the manufacture of a right and a left hand unit which are to be combined to make up this vehicle.

Fig. 5 shows the left hand unit of the vehicle supported on its track 26 and on the skid shoe 82. This is also shown in Fig. 6. A like right hand unit will be shipped to the customer at the same time as the left hand unit. One of the features of this invention is that it makes it possible to have a vehicle transportable on rail cars which can be twice as wide as any vehicle heretofore constructed. By looking at Fig. 5, it will be seen that the distance between the outside edge of the track 26 and the face 58 of the case can be the maximum width clearance permitted on a rail vehicle. In effect this doubles the width of the assembled vehicle over anything that could be shipped assembled heretofore.

When the right and left hand units of the vehicle have been shipped to the place where they are to be used, they are removed from the rail vehicle and placed on a platform or on the ground in about the position shown in Fig. 2 where the right and left units are in alignment and ready to be drawn together. In some cases the units have been moved together into the position shown in Fig. 1 simply by means of pushing on the side of either the right or the left unit with a bulldozer, or it can be done with block and tackle. When the units are in the position shown in Fig. 2, and just prior to their being moved together, the aligning plug 61 is inserted in the bearing recess 59 in either the right or the left hand unit. As the units go together care is taken that this aligning plug enters the bearing recess 59 in the other case unit. When the units have been moved together so that the face 58 on the left hand unit and the face 58 on the right hand unit are against each other, and the faces of the flanges 56 on the stiff beam are against each other, all that remains to be done is to insert the securing bolts.

The preferable order of operations on assembly is that before the flanges 56 on the stiff beam are bolted together, the two portions of the king bolt are threaded together and the nuts 63 and 64 are tightened so as to pull together the faces 58 of the two cases 10. The aligning plug 61 assures correct alignment of the two cases 10.

The next step in the preferred order of assembly is for the mechanic to insert the bolts *57* in the holes [57] in the flanges 56 to unite the stiff beam at the front of the vehicle. The skid shoes 82 can be removed as soon as the flanges 56 on the stiff beam have been bolted together. This may be done by running the forward ends of the tracks on a raised surface or it may be done by jacking up the forward end to slide out the shoes. The next step is to insert the bolts to secure the rear connection 74 which supports the ends of the draw bar crescents 75. Then the final step is for the mechanic to insert bolts to fasten together the flanges 22b, 24b, 32b, and 38b for the various control levers. This completes the assembly of the vehicle and it is to be noted that in this assembly there are no oil lines, fuel lines, or leak proof gaskets necessary to be connected or aligned. Every operation in the assembly of the two units into a single vehicle was such that it could be done by unskilled labor. When it is desired to ship the vehicle to a new location, the foregoing steps can be done in reverse.

I claim:

1. In a track layer type of self-propelled vehicle having propelling tracks, the combination of a pair of self contained power units; each unit having, a main case with a transmission, and having a final drive means therein; said cases each having parallel vertical oppositely disposed fore and aft side faces, with aligned bores extending inwardly at right angles to said faces; a forwardly extending frame secured to each of said main cases; an engine and clutch means supported on each frame, and connected to its respective transmission; control levers for separately controlling said engines and transmissions; a stub shaft secured in each of the opposite of said aligned bores; a track drive sprocket and a track frame secured on each of said stub shafts; a king bolt secured in each of the adjacent of said aligned bores, whereby the adjacent main cases are held together with adjacent parallel faces thereon substantially in contact; a stiff beam near the forward end of said vehicle rigidly connecting together the aforesaid forwardly extending frames[;] and [means for] supporting the forward end of said *forwardly extending frames* [vehicle] on the forward end of each of said track frames.

2. The device of claim 1 in which said stiff beam is split in the center on about the same plane as the abutting faces of the adjacent cases, and a flanged plate is formed on each adjacent end so the same may be bolted together or unfastened without removing said stiff beam portions from the bottoms of said frames.

3. The device of claim 1 in which there is a perforated aligning collar, extending into the aligned bores of the adjacent faces of said main cases and through which said king bolt is passed.

4. The device of claim 1 in which said king bolt is made in two parts with threaded means connecting the two parts whereby said king bolt may be connected or disconnected without removal of each or either part from its respective bore when assembling or disassembling the vehicle.

5. A self-propelled vehicle, having in combination two chassis, arranged to be split into separate self-contained chassis along a vertical line running fore and aft down the center of the vehicle and in which each chassis includes; a one piece metal main case member with a transmission drive therein, said case having its vertical fore and aft side faces arranged parallel to each other, and having a bore extending inwardly from each side face at right angles thereto, and having connected rigidly therewith a forwardly extending frame portion, with an engine mounted thereon; drive means between said engine and the transmission drive in said main case member; a shaft means secured in one bore of said cases on each outer face; a track frame secured to and a drive sprocket mounted on said shaft means; a road engaging track mounted on said frame; and securing means for detachably fastening said two chassis together as one, including a king bolt mounted in the aligned bores in the adjacent faces of said main cases, and a second rigid securing means forward of said king bolt.

6. The device of claim 5 in which said securing means includes, an aligning plug fitted into said adjacent aligned bores around said king bolt.

7. The device of claim 5 in which said king bolt is severable in the general area where it passes through the vertical plane of the adjacent faces of said main cases.

8. In a twin engine, twin drive, divisible, self-propelled vehicle, the combination of road engaging means on each side of said vehicle, said means including a fore and aft extending frame; a pair of separate frames each supporting one of said frame means; a power plant and fuel reservoir mounted in each of said separate frames; a main case combined with each of said separate frames, each main case including, drive means for transmitting the power of said engine to said road engaging means; and easily severable means for rigidly securing said two main cases to each other in close juxtaposition at a plurality of points along the fore and aft vertical center line of said vehicle so they move as one when connected together.

9. The device of claim 8 in which [there is a separate] *one of said* securing means [connecting] *connects* the frames forward of said connected main cases.

10. The device of claim 8 in which said last named securing means includes a king bolt secured in aligned horizontal bores in said main cases.

11. The device of claim 10 in which there is an aligning plug extending into said aligned bores surrounding said king bolt.

12. In combination, a vehicle having a pair of engines, a pair of transmissions, a pair of final drive wheels, and a pair of supporting tracks; a pair of separate frames each supporting as a grouped complementary mating unit one of each of the aforesaid pairs of parts; a fore and aft extending track frame secured to each of said separate frames and having the drive to said final drive wheel arranged at one end of said track frame; a stiff beam securing together forward portions of said separate frames, said stiff beam being made up of two parts secured together in the plane of the center line of said vehicle by flanged plates, bolted together; and a king bolt securing to each other the rear end of each of said separate frames; whereby said vehicle when in operation is a complete unit and when said flanged plates are unbolted and said king bolt is removed each component half of said vehicle is itself a complementary operative half unit.

13. In a self-propelled vehicle the combination of, a pair of self-contained power units laying side by side; each of said power units comprising a frame having therein an independently controlled source of power, a transmission, a clutch, and a road engaging drive means including a frame secured to said power unit frame and extending alongside thereof and connected at one end to said power source; said power unit frames being connected to each other by a severable fitting secured to and adjacent the forward end of each of said units; said fitting being severable along a fore and aft line coinciding substantially with the like plane between said units; and being connected by other severable securing means adjacent the rear end of said units, whereby said power units may be separated or assembled without the severance or connection of any parts comprising said source of power, transmission, clutch, or road engaging drive means.

*14. A tractor having severable, complementary halves each half comprising a frame, an engine, a traction element having a track roller frame, an idler at one end of the track roller frame, a drive sprocket at the other end of said frame, an endless track carried and driven by said idler and drive sprocket, means to transmit power from said engine to said drive sprocket, and means spaced from each other along the dividing line between said halves to detachably hold said halves in operational relationship to each other, one of said means comprising a member extending transversely of the two halves and supporting said halves upon the track roller frames.*

*15. A tractor having severable, complementary halves each half comprising a frame, an engine, a traction element having a track roller frame, an idler at one end of the track roller frame, a drive sprocket at the other end of said frame, an endless track carried and driven by said idler and drive sprocket, as well as means to transmit power from said engine to said drive sprocket; and means spaced from each other along the dividing line between said halves to detachably hold said halves in operational relationship to each other, one of said means including a detachable drawbar support at the rear of the tractor halves, and another of said means comprising a member that provides for detachable connection between said halves and also extends transversely of said halves to connection with the track roller frames to provide support for said halves on said track roller frames.*

*16. A tractor having severable, complementary halves each half comprising a frame, an engine, a traction element having a track roller frame, an idler at one end of the track roller frame, a drive sprocket at the other end of said frame, an endless track carried and drive by said idler and drive sprocket, as well as means to transmit power from said engine to said drive sprocket; and means for detachably connecting said halves, said means including a structural member on each tractor half extending transversely of said halves to the track roller frames to provide a support for said halves on said track roller frames, and which structural members are detachably connected in substantially opposed relationship whereby said tractor halves are held in operational relationship to each other.*

*17. A tractor having severable, complementary halves each half comprising a frame, an engine, a traction element having a track roller frame, an idler at one end of the track roller frame, a drive sprocket at the other end of said frame, an endless track carried and driven by said idler and drive sprocket, as well as means to transmit power from said engine to said drive sprocket; and holding means spaced from each other along the dividing line between said halves to detachably hold said halves in operational relationship to each other, said holding means including a detachable drawbar support at the rear of the tractor halves, a shaft extending into registering bores in the adjoining sides of said tractor halves, and transverse extensions of holding means connected to said track roller frames to provide support for said halves on said track roller frames.*

*18. A tractor having severable, complementary halves each half comprising a frame, an engine, a traction element having a track roller frame, an idler at one end of the track roller frame, a drive sprocket at the other end of said frame, an endless track carried and driven by said idler and drive sprocket, as well as means to transmit power from said engine to said drive sprocket; and holding means spaced from each other along the dividing line between said halves to detachably hold the two halves in operational relationship to each other, said holding means including a shaft extending into registering bores in the adjoining sides of said halves, and one holding means including a transverse extension from said halves that is connected to the track roller frames and provides support for said halves on said track roller frames.*

(References on following page)

References Cited in the file of this patent or the original patent

UNITED STATES PATENTS

| | | |
|---|---|---|
| 1,158,680 | Griffin | Nov. 2, 1915 |
| 1,389,010 | Putnam | Aug. 30, 1921 |
| 1,430,251 | Parker | Sept. 26, 1922 |

| | | |
|---|---|---|
| 1,675,013 | Young | June 26, 1928 |
| 1,881,748 | Ljungkull | Oct. 11, 1932 |
| 1,953,515 | Smith | Apr. 3, 1934 |

FOREIGN PATENTS

| | | |
|---|---|---|
| 182,239 | Switzerland | June 16, 1936 |